US007960891B2

(12) United States Patent
Esenwein

(10) Patent No.: US 7,960,891 B2
(45) Date of Patent: Jun. 14, 2011

(54) POWER TOOL WITH INTEGRATED AUXILIARY TOOL FOR REPLACING BRUSHES

(75) Inventor: Florian Esenwein, Uhingen-Holzhausen (DE)

(73) Assignee: Robert Bosch GmbH, Stuttgart (DE)

( * ) Notice: Subject to any disclaimer, the term of this patent is extended or adjusted under 35 U.S.C. 154(b) by 53 days.

(21) Appl. No.: 12/036,405

(22) Filed: Feb. 25, 2008

(65) Prior Publication Data

US 2008/0218024 A1 Sep. 11, 2008

(30) Foreign Application Priority Data

Mar. 5, 2007 (DE) ........................ 10 2007 010 494

(51) Int. Cl.

| | |
|---|---|
| ***H02K 13/00*** | (2006.01) |
| ***H01R 39/38*** | (2006.01) |
| *H02K 5/22* | (2006.01) |
| *H01R 39/00* | (2006.01) |
| *H01R 39/44* | (2006.01) |

(52) U.S. Cl. ........ 310/239; 310/240; 310/242; 310/243; 310/244; 310/245; 310/246; 310/247; 314/130

(58) Field of Classification Search .................. 310/239, 310/240, 242, 243, 244, 245, 246, 247; 314/130; *H01R 39/38, 39/44, 39/00, 39/28; H05B 31/18; H02K 5/22, 13/00*

See application file for complete search history.

(56) References Cited

U.S. PATENT DOCUMENTS

| | | | | |
|---|---|---|---|---|
| 2,780,949 | A * | 2/1957 | Hoy | 310/240 |
| 3,233,676 | A * | 2/1966 | Lynes | 166/152 |
| 3,450,917 | A * | 6/1969 | Zelik et al. | 310/247 |
| 3,710,160 | A * | 1/1973 | Voglesonger | 310/247 |
| 3,911,304 | A * | 10/1975 | Seely | 310/242 |
| 4,355,254 | A * | 10/1982 | Oki et al. | 310/239 |
| 4,409,508 | A * | 10/1983 | Ooki et al. | 310/239 |
| 7,180,219 | B2 * | 2/2007 | Xu | 310/239 |
| 2007/0035195 | A1 * | 2/2007 | Custforth et al. | 310/239 |

* cited by examiner

*Primary Examiner* — Quyen Leung
*Assistant Examiner* — Michael Andrews
(74) *Attorney, Agent, or Firm* — Michael J. Striker

(57) ABSTRACT

A power tool has an electric motor that includes a commutator, with which at least one commutator brush is acted upon with spring force via at least one commutator spring in the direction of a non-rotatable collector of the commutator. At least one auxiliary tool for adjusting the commutator spring is located on a component of the power tool.

12 Claims, 2 Drawing Sheets

POWER TOOL WITH INTEGRATED AUXILIARY TOOL FOR REPLACING BRUSHES

CROSS-REFERENCE TO A RELATED APPLICATION

The invention described and claimed hereinbelow is also described in German Patent Application DE 10 2007 010 494.6 filed on Mar. 5, 2007. This German Patent Application, whose subject matter is incorporated here by reference, provides the basis for a claim of priority of invention under 35 U.S.C. 119(a)-(d).

BACKGROUND OF THE INVENTION

The present invention relates to a power tool with an electric motor.

With power tools operated using commutator motors (universal or direct-current motors), current is transferred to an armature winding via a commutator. To this end, (carbon) commutator brushes glide over the collector (contact roller) of the commutator. The collector is usually laminated, is non-rotatably mounted on an armature shaft, and is connected with the armature winding in an electrically conductive manner. During operation of the power tool, the commutator brushes undergo frictional wear due to the sliding motion. With high-quality power tools in particular, worn commutator brushes may be replaced with new commutator brushes. To accomplish this, a spring that presses the worn commutator brush against the collector of the commutator must first be displaced, i.e., lifted, usually.

To ensure easy access to the spring and the worn commutator brush, it is known to integrate a brush cover in the housing above the commutator brush, so that the power tool need not be fully disassembled in order to replace the commutator brush. An auxiliary tool that is typically filigree and hook-shaped is required to displace the spring. An auxiliary tool of this type is often a piece of wire, cable, or the like that has been bent into the necessary shape. If material of this type is unavailable for manufacturing the auxiliary tool, operators often try to remove the spring using other, unsuitable tools, such as a screwdriver, which often results in damage to the power tool.

SUMMARY OF THE INVENTION

The object of the present invention, therefore, is to refine a power tool such that the commutator brush may be replaced as conveniently as possible.

In keeping with these objects and with others which will become apparent hereinafter, one feature of the present invention resides, briefly stated, in a power tool, comprising an electric motor that includes a commutator with a collector and at least one commutator brush; at least one commutator spring acting upon said at least one commutator brush with a spring force in a direction of said collector of said commutator; and at least one auxiliary tool configured for adjusting said commutator spring and located on a component of the power tool.

The present invention is based on the idea of integrating the auxiliary tool required to displace the spring that acts on the commutator brush in the power tool, i.e., to assign it to a component of the power tool, and/or to locate it on this component. Due to the inventive design of the power tool with an integrated auxiliary tool, an operator no longer needs to create an auxiliary tool out of wire, cable, etc. The defined positioning of the auxiliary tool on a component of the power tool also ensures that the auxiliary tool will not become misplaced and that the operator will not have to spend time looking for it. In addition, damage to the power tool that could occur when the commutator brushes are replaced is prevented, since unsuitable tools such as screwdrivers, etc., will not be used.

For special device designs that require that the spring that acts on the worn commutator brush be removed, it may be reasonable to design the auxiliary tool with special shapes, or to provide several auxiliary tools on one or more power tool components. In the context of the present invention, the expression “displacing the spring” refers to disassembling and/or assembling the spring entirely, i.e., removing or installing the spring entirely, and to any motion of the spring that is required to gain access to the commutator brush, in particular displacing the spring into a “park” position and removing it from the park position after the new commutator brush has been installed.

In a refinement of the present invention, it is advantageously provided that the component on which the auxiliary tool is located is a housing component in particular. The housing component is preferably a brush cover, which must be removed before the commutator brush may be replaced. The component—the housing component in particular, on which the auxiliary tool is installed—preferably also serves as a functional part of the auxiliary tool and, e.g., as a handle.

According to an advantageous refinement of the present invention, the auxiliary tool is detachably connected to the component, i.e., it may be removed from the component in order to displace the spring from the component. Once the commutator brush has been replaced, the auxiliary tool may be reconnected with the component.

With some power tool designs, to protect the power tool components, it may be advantageous to provide a cover for the auxiliary tool in its secured (retained) position. The cover would prevent damage to the power tool components. Highly diverse types of covers may be used, e.g., rotary covers, telescoping covers, folding covers, swivel covers, or removable covers, etc.

In addition or as an alternative to a detachable connection of the auxiliary tool on the component of the power tool, it is advantageous to locate the auxiliary tool such that it may be displaced between a retained position or a connection position, in which the auxiliary tool is supported (exclusively) on the power tool, and a working position, in which the auxiliary tool may be used as intended, to displace the spring. In the working position, the auxiliary tool preferably extends beyond the circumferential contour of the component on which it is mounted, and particular in the direction of its longitudinal extension, so that it may interact with the spring without restriction.

Various displacement mechanisms—which may be used in combination—are realizable in order to displace the auxiliary tool between its retained position and its working position. It is possible, e.g., to mount the auxiliary tool such that it is rotatable or swivelable around an axis using a pivot or swivel joint, and to therefore displace the auxiliary tool between the positions stated, in particular by hand.

It is also feasible to support the auxiliary tool on the component of the power tool such that it may be extended, and preferably pulled out. Preferably, the auxiliary tool may be pulled out of a cover, which is designed as a retaining pocket. The cover serves the purpose of protecting the auxiliary tool and other power tool components from damage.

With an extendable design of the power tool in particular, it is advantageous when the auxiliary power tool catches in the device when the power tool component that accommodates it—a housing cover, in particular—is pulled off or removed, and is therefore automatically pulled out of its retained position and into its working position when the component is removed from its retained position. After removal, in particular when the power tool component is pulled out, the auxiliary tool is therefore advantageously ready for use immediately.

It is also feasible to design the auxiliary tool such that it may be folded out or pulled out in a telescoping manner. An embodiment of this type is extremely advantageous due to the small amount of space it requires.

To provide the operator with better control of the auxiliary tool during operation, it is advantageous when the auxiliary tool may be fixed in the working position in particular, and when it is snapped in place, in particular.

According to an embodiment of the present invention that is particularly cost-favorable to manufacture, the auxiliary tool is designed as a single piece with a power tool component. For example, the power tool component may be formed together with the auxiliary tool using an injection-moulding procedure.

The auxiliary tool is preferably designed such that a form-fit connection may be created between it and the commutator spring, so that the displacement forces to be applied may be transferred in a suitable manner.

For a large number of power tool configurations, it is advantageous when the auxiliary tool is designed as a type of hook for this purpose, in particular so that it may interact with a spring leg for displacing the commutator brush into a park position or out of the park position. In the park position, the commutator brush may be easily replaced. As an alternative, it is feasible to design the auxiliary tool as tongs, with which the commutator spring may be displaced.

The auxiliary tool is preferably made of metal, and is designed as a bent wire part in particular. To prevent current from passing through the auxiliary tool and, therefore, to protect the operator from harm, an insulator is provided, e.g., in the form of a shrink tube or a jacket.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
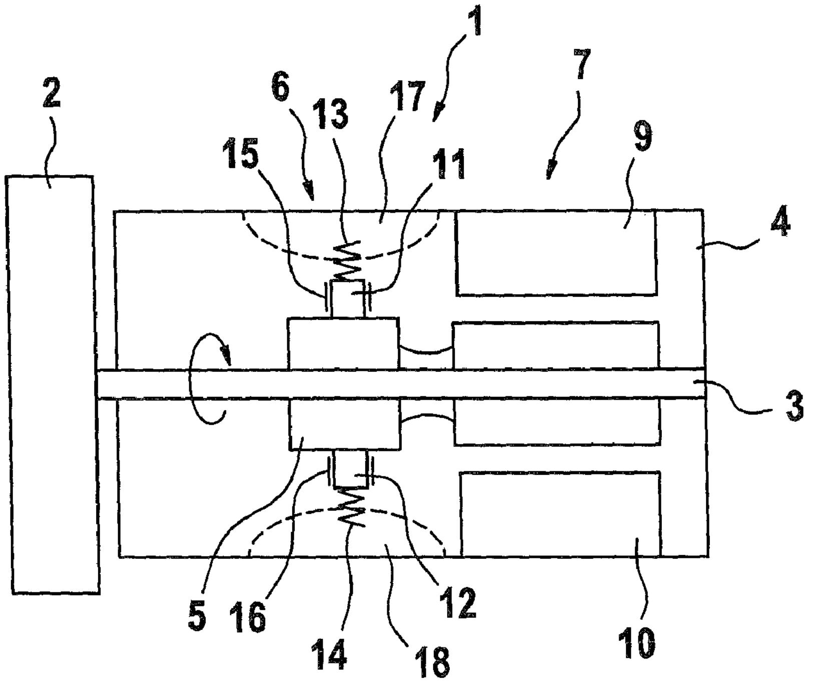
FIG. 1 is a view showing a schematic depiction of a power tool.

Identical components and components with the same functionality are labeled with the same reference numerals in the figures.

FIG. 1 shows, as an example and in a schematic depiction, a power tool 1 designed as a grinding tool, with a rotationally driven grinding disk 2. Grinding disk 2 is located directly on an armature shaft 3 (motor shaft), which is rotatably mounted inside a housing 4. A collector 5 of a commutator 6 of an electric motor 7 is located on armature shaft 3. Electric motor 7 includes commutator 6 and an armature stack 8 with a not-shown armature winding. The armature stack and/or its armature winding, which are non-rotatably located on armature shaft 3, are connected with collector 5 in an electrically conductive manner. Armature stack 8 is located radially inside two separated permanent magnets 9, 10.

In addition to collector 5, commutator 6 also includes two commutator brushes 11, 12, which are made of graphite in particular, which are acted upon with spring force in the radially inward direction on collector 5 using a schematically depicted commutator spring 13, 14. Commutator brushes 11, 12 are guided in displaceable brush holders 15, 16. Commutator brushes 11, 12 are electrically contacted (not shown) and supply collector 5 and, therefore, the armature winding of armature stack 8 with electrical energy.

To replace commutator brushes 11, 12 when they become worn, associated commutator spring 13, 14 must first be moved into a park position or removed. To this end, brush covers 17, 18 (housing cover) are removed from housing 4, to gain access to commutator springs 13, 14. Commutator springs 13, 14 are then displaced using a hook-shaped auxiliary tool 19 shown in FIGS. 2 through 5, which is located on a power tool component.

Figure 2:
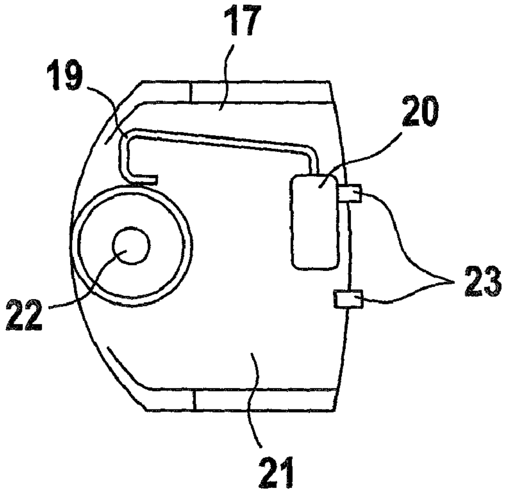
FIG. 2 is a view showing a first embodiment of a component with an auxiliary tool installed thereon such that it may be swiveled, in its retained position.
Figure 3:
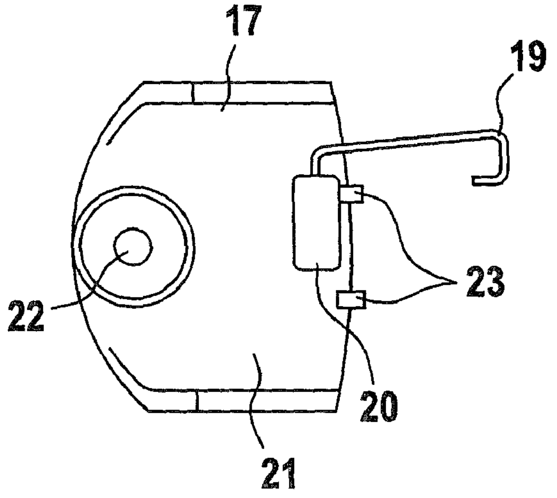
FIG. 3 is a view showing an exemplary embodiment in FIG. 2, with the auxiliary tool swiveled into its working position.

With the exemplary embodiment shown in FIGS. 2 and 3, hook-shaped auxiliary tool 19 is designed as a bent-wire part and is secured to an underside 21 of a brush cover 17 using a pivot 20. Brush cover 17 is removed from housing 4 of power tool 1 to remove the commutator spring. To this end, a fastening screw—which has been guided through a screw hole 22 and screwed into an inner thread of power tool 1—is unscrewed, then brush cover 17 and insertion tabs 23 integrally formed thereon may be removed from power tool 1.

Pivot 20 serves to swivel auxiliary tool 19 from the retained (park) position shown in FIG. 2—in which it bears against underside 21 of brush cover 17 and does not extend beyond the circumferential contour of brush cover 17—into the working position shown in FIG. 3, in which it extends beyond the circumferential contour of brush cover 17 in the direction of its longitudinal extension and may therefore be used.

Figure 4:
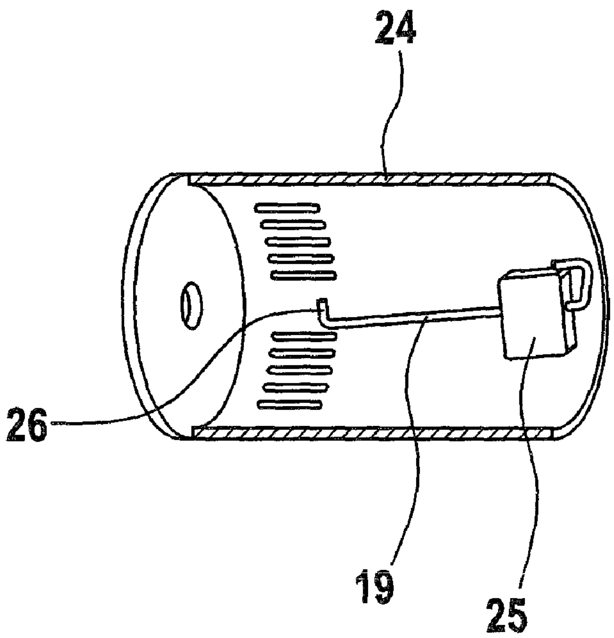
FIG. 4 is a view showing an alternative location of an auxiliary tool on a component of the power tool, in its retained position.
Figure 5:
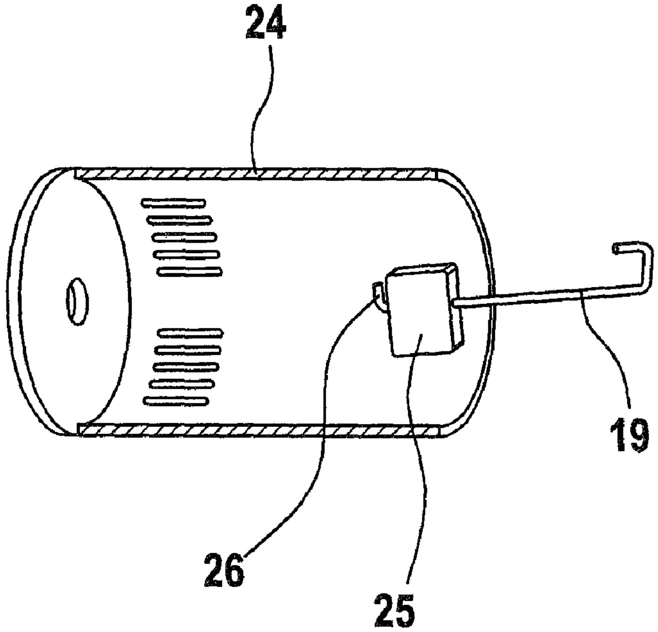
FIG. 5 is a view showing an exemplary embodiment in FIG. 4, with an auxiliary tool that may be extended out of its retained position.

FIGS. 4 and 5 show a further exemplary embodiment, in which auxiliary tool 19 is not installed on a brush cover 17, but on a housing pot 24 of a power tool 1 with a pot-shaped design. Auxiliary tool 19 is extendable out of the retained position shown in FIG. 4 and into the working position shown in FIG. 5. A longitudinal guide 25 for the auxiliary tool 19 is provided. An axial stop 26 on the left—according to the plane of the drawing—end of auxiliary tool 19 prevents auxiliary tool 19 from sliding out of longitudinal guide 25, thereby retaining it permanently on power tool 1.

It will be understood that each of the elements described above, or two or more together, may also find a useful application in other types of constructions differing from the type described above.

While the invention has been illustrated and described as embodied in a power tool with an integrated auxiliary tool for replacing brushes, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A power tool, comprising:

a housing component formed as a brush cover;

an electric motor that includes at least one commutator brush;

at least one commutator spring acting upon said at least one commutator brush;

at least one auxiliary tool extended longitudinally and located completely outside of said brush cover, said at least one auxiliary tool having a first end which is non-removably, fixedly secured to an underside of said brush cover outside of the latter and a second end longitudinally opposite the first end and configured for displacing said commutator spring; and a joint selected from the group consisting of a pivot joint and a swivel joint and arranged so that said auxiliary tool is movable in a way selected from the group consisting of rotated and swiveled, and both, using said joint on the underside of the brush cover and completely outside of the latter.

2. A power tool as defined in claim 1, wherein said at least one auxiliary tool is pivotably connected with said housing component.

3. A power tool as defined in claim 1, wherein said auxiliary tool is connected with said housing component in such a manner that said auxiliary tool is adjustable between a retained position and a working position.

4. A power tool as defined in claim 1, wherein said auxiliary tool is arranged so that it is extendable out of said brush cover.

5. A power tool as defined in claim 1, wherein said auxiliary tool is arranged so that it is pullable out of said brush cover.

6. A power tool as defined in claim 1, wherein said auxiliary tool is movable in a telescopic manner in a way selected from the group consisting of foldable out and pullable out.

7. A power tool as defined in claim 1, wherein said auxiliary tool is fixable in a position selected from the group consisting of a working position, a retained position, and both.

8. A power tool as defined in claim 1, wherein said auxiliary tool is snappable in a position selected from the group consisting of a working position, a retained position, and both.

9. A power tool as defined in claim 1, wherein said auxiliary tool is configured as a single piece with said housing component.

10. A power tool as defined in claim 1, wherein said auxiliary tool is configured in a shape of a hook.

11. A power tool as defined in claim 10, wherein said auxiliary tool is composed of metal with an insulation.

12. A power tool, comprising;

a housing component formed as a brush cover;

an electric motor that includes at least one commutator brush;

at least one commutator spring acting upon said at least one commutator brush;

at least one auxiliary tool extended longitudinally and having a first end and a second end longitudinally opposite the first end and configured for displacing said commutator spring; and a joint selected from the group consisting of a pivot joint and a swivel joint and arranged so that said auxiliary tool is movable in a way selected from the group consisting of rotated and swiveled, and both, using said joint on the underside of the brush cover, wherein said auxiliary tool is secured to said brush cover which is removable together with said auxiliary tool from said power tool so that said auxiliary tool can be used.

* * * * *